Dec. 9, 1947. R. V. HANCHETT 2,432,194
INSULATION SEALING COVER FOR ELECTRIC COILS
Filed Jan. 24, 1945
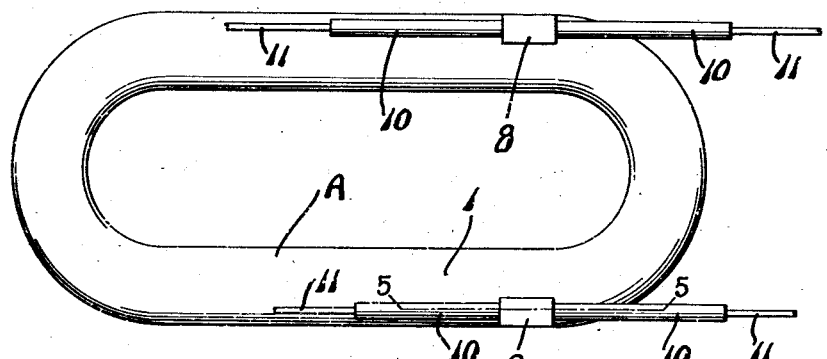
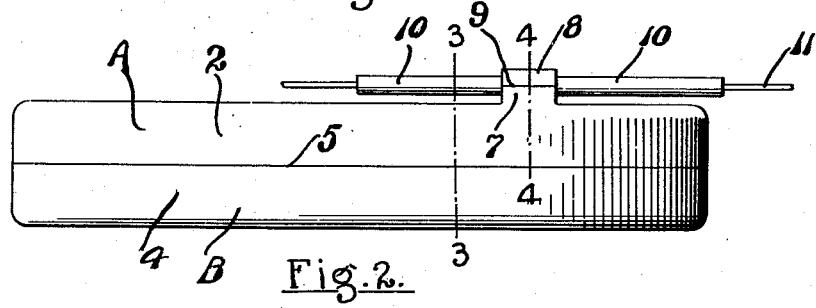
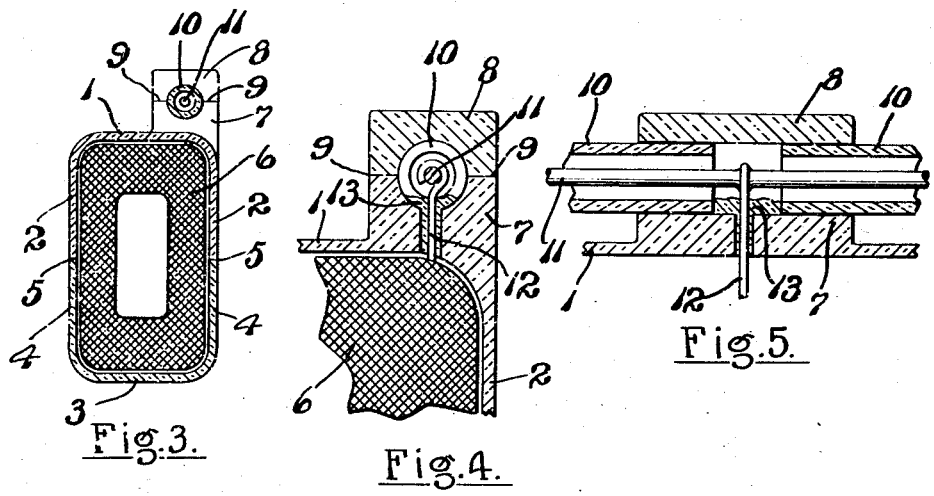
Inventor
Ralph V. Hanchett
By Liverance and Van Antwerp
Attorneys Patented Dec. 9, 1947

2,432,194

UNITED STATES PATENT OFFICE 2,432,194

INSULATION SEALING COVER FOR ELECTRIC COILS

Ralph V. Hanchett, Big Rapids, Mich., assignor to Hanchett Manufacturing Company, Big Rapids, Mich., a corporation of Michigan Application January 24, 1945, Serial No. 574,433

1 Claim. (Cl. 175—21)

This invention is directed to the sealing of electric coils, insulating them electrically and protecting them from effects of moisture or other deteriorating agents which when not properly protected against have access to and come in contact engagement with the coils when in service.

One place where electric coils are used in considerable numbers is in connection with magnetic chucks. The chucks of varying sizes will have numbers of the electric coils electrically connected in series embedded and very securely connected with the bed of the chuck which is a support for coils. It has heretofore been a serious problem to properly safeguard the electric coils which are used against deterioration and other failure, and to repair such magnetic chucks in the event of the failure of one of a number of the electric coils which may form a part of a chuck. The user of the chuck heretofore, in general practice, in order to have the chuck placed in proper repair, must return the entire chuck with all of the coils with the attendant expense of shipment, even though one only of the coils therein is defective. In addition, the chuck is out of service for a considerable time or that necessary to send it to the manufacturer, have it repaired and then have it returned to the user.

With my invention each coil is in effect a separable unit and if, for example, in a magnetic chuck having twenty of such coils in series one becomes defective it is readily removed, and from spare coils on hand, made in accordance with my invention, a replacement may be made requiring but little time and no unnecessary shipment of large and heavy chucks one part only of which is in a defective condition. Furthermore each electric coil is sealed against moisture contact or the subjecting of the coil to other deteriorating agencies. Moreover, with my invention a very simple, practical and economical electric insulation and moisture proof enclosure of the coil is made, very materially safeguarding and protecting the coil against damage and deterioration.

An understanding of the invention may be had from the following description taken in connection with the accompanying drawing, in which, Fig. 1 is a plan view of an electric coil having the sealing cover of my invention applied thereto.

Fig. 2 is a side elevation thereof.

Fig. 3 is a transverse section somewhat enlarged on the plane of line 3—3 of Fig. 2.

Fig. 4 is an enlarged fragmentary transverse section on the plane of line 4—4 of Fig. 2, and Fig. 5 is a fragmentary longitudinal vertical section substantially on the plane of line 5—5 of Fig. 1.

Like reference characters refer to the like parts in the different figures of the drawing.

The sealing cover which I have provided in connection with my invention to completely enclose an electric coil is preferably formed into two parts, an upper part A and a lower part B, each of a channel cross section. Said cover is made of a suitable plastic material, of which there are a number which may be used. The upper cover section A has a top web 1 with depending parallel side flanges 2 and the lower section B a bottom web 3 with upwardly extending side flanges 4. The two parts or halves of the sealing cover are shaped in accordance with the shape of the coil 6 over which they are placed. As shown the coil, which is one of a type used in magnetic chucks, is elongated and has parallel sides and curved connecting ends. Of course said coils may be made in a variety of shapes and outlines. The edges of the side flanges 2 and 4 come into engagement at 5 and are integrally sealed by any suitable process, such as softening the plastic material with a solvent at such edges and pressing them together form an integral joint; or any other suitable sealing method may be used. This completely seals the coil within an enclosing moisture impervious cover except at the points where the lead wires of the coil are to be carried outside.

On the upper cover section A described, at the places where the lead wires from the coil are carried outwardly an integral projection 7 is provided having a flat upper face over which a covering block 8 is placed, bearing thereagainst at the adjacent surfaces at a joint indicated at 9. The block 8 is of the same plastic material and is permanently secured and integrally connected in the same manner as described with respect to the joint between the cover sections at 5. The projection 7 and the block 8 lengthwise thereof are provided each with a semi-cylindrical longitudinal recess extending their full lengths, in the upper side of the projection 7 and the lower side of the covering block 8, for the reception of the inner end portions of tubes 10 likewise of plastic material which, as shown in Fig. 5, are inserted into the cylindrical opening made and may be sealed in place. Said tubes 10 extend for a distance in each direction from the parts 7 and 8 to which connected.

Circuit wires 11 extend through the alined tubes 10 and from one coil to the other to connect them in the proper relation. The lead wires 12 from the ends of the coil windings pass upwardly through suitable openings made in the parts 7 of the upper cover section and are engageable with the series connecting wires 11 as shown in Fig. 4. The openings through which the lead wires 12 pass are preferably sealed by filling with a suitable composition 13 which may be melted and poured in enough to close the openings and which will solidify, thereby completing the sealing of the coil against moisture or other undesirable materials.

It is to be understood that the wires 11 between one coil 6 and the next adjacent coil will be covered by tubes of the same diameter and of the same material as the tubes 10 having ends abutting against the ends of the tubes 10 and joined therewith in the same manner, using a softening solvent for the plastic and forcing the softened ends of the tubes together to provide an integral connection. When any coil 6 becomes defective and needs to be replaced it alone has to be removed cutting the tube sections 10 thereof from the intervening tube sections to which connected and which lead to the next adjacent coils. From spare coils on hand a replacement may be made very quickly and easily without the necessity of having the machine with which the chuck is used remain idle while the chuck in its entirety is removed, shipped to the manufacturer, repaired and returned.

The construction described has proved to be of great practical utility. While it has been described in one place of use, namely, in connection with magnetic chucks, the invention of course is not in any sense limited to use with magnetic chucks alone, but is of utility in sealing and protecting electric coils of many varieties used in many places. The coils are protected particularly from the moisture, either in liquid or vapor form, or from any other deteriorating materials which are met with in use.

The invention is defined in the appended claim and is to be considered comprehensive of all forms of structure coming within its scope.

I claim:

A protective cover for electric coils comprising, two members of a plastic, electric insulating and moisture impervious character, said members having the outline of the coils and channel shaped in cross section, and adapted to enclose an electric coil located in the lower of said covering members with the second and upper of said covering members in contact engagement with the other throughout their edges and being continuously sealed at such edges, said upper covering member having integral projections with openings therethrough for passage of lead wires of the coil, said projections at their upper side being grooved longitudinally to provide a longitudinal semi-cylindrical recess, a block of like material over the upper side of each projection and sealed thereto, said block having a longitudinal semi-cylindrical recess at its under side, tubes of like plastic material inserted into said recess one at each end thereof for passage of circuit wires passing through said tubes to which the lead wires from a coil may be electrically connected.

RALPH V. HANCHETT.

REFERENCES CITED

The following references are of record in the file of this patent:

UNITED STATES PATENTS

| Number | Name | Date |
| --- | --- | --- |
| 1,132,297 | Apple | Mar. 16, 1915 |
| 1,551,290 | Eaton | Aug. 25, 1925 |
| 2,090,918 | Reichard | Aug. 24, 1937 |
| 1,888,288 | Purdy | Nov. 22, 1932 |

FOREIGN PATENTS

| Number | Country | Date |
| --- | --- | --- |
| 647,072 | France | July 24, 1928 |